(12) United States Patent
Hilberts et al.

(10) Patent No.: US 8,209,855 B2
(45) Date of Patent: Jul. 3, 2012

(54) METHOD OF SPLICING ELECTRICAL CABLES

(75) Inventors: Albert J. Hilberts, Vero Beach, FL (US); James Miller, Sebastian, FL (US); James H. Muir, Indialantic, FL (US)

(73) Assignee: M.C. Miller Co., Sebastian, FL (US)

( * ) Notice: Subject to any disclaimer, the term of this patent is extended or adjusted under 35 U.S.C. 154(b) by 78 days.

(21) Appl. No.: 12/925,556

(22) Filed: Oct. 26, 2010

(65) Prior Publication Data

US 2012/0097444 A1    Apr. 26, 2012

(51) Int. Cl.
*H01B 13/20* (2006.01)

(52) U.S. Cl. ............... 29/828; 29/827; 29/869; 29/871; 29/883; 29/887

(58) Field of Classification Search ............. 29/828, 29/869–871, 827, 887, 867, 883, 564.4; 385/100, 385/95, 96, 97, 98, 99, 138; 439/136, 156, 439/265, 266; 174/88 R, 84 R, 76, 91, 93, 174/85

See application file for complete search history.

(56) References Cited

U.S. PATENT DOCUMENTS

| | | | |
|---|---|---|---|
| 4,627,490 A | 12/1986 | Moore | |
| 4,814,547 A * | 3/1989 | Riley et al. | 174/653 |
| 4,859,200 A | 8/1989 | McIntosh et al. | |
| 4,927,386 A | 5/1990 | Neuroth | |
| 5,289,882 A | 3/1994 | Moore | |
| 5,478,970 A | 12/1995 | Lawler et al. | |
| 5,670,747 A | 9/1997 | Lawer et al. | |
| 5,797,761 A | 8/1998 | Ring | |
| 5,876,528 A * | 3/1999 | Nikkels et al. | 156/48 |
| 6,202,743 B1 | 3/2001 | Moore | |
| 6,222,977 B1 * | 4/2001 | Kawada et al. | 385/136 |
| 6,545,221 B1 | 4/2003 | Halpert et al. | |
| 6,881,079 B2 * | 4/2005 | McHugh et al. | 439/136 |
| 6,910,870 B2 | 6/2005 | Ebner | |
| 7,405,358 B2 | 7/2008 | Emerson | |
| 7,544,105 B2 | 6/2009 | Stagi et al. | |
| 2004/0012198 A1 | 1/2004 | Brotzell et al. | |
| 2008/0026623 A1 | 1/2008 | Emerson | |
| 2009/0197447 A1 | 8/2009 | Maeland | |

* cited by examiner

*Primary Examiner* — Derris Banks
*Assistant Examiner* — Tai Nguyen
(74) *Attorney, Agent, or Firm* — William M. Hobby, III

(57) ABSTRACT

A method of splicing a power cable used to supply electricity to down hole submersible pumps uses a pair of annular armored seal members that are slid over the ends of an insulated electrical conductor being spliced together. Each armored seal member has a plurality of O-ring seals on one end thereof and a plurality of openings in the side thereof and are used to cover and protect a crimped conductor being spliced together. The method and apparatus allow a pair of spliced electrical cables to be used in an adverse environment.

9 Claims, 3 Drawing Sheets

METHOD OF SPLICING ELECTRICAL CABLES

BACKGROUND OF THE INVENTION

The present invention relates generally to a method of splicing electrical cables together and especially to a method of splicing a power cable used to supply electricity to down hole submersible pumps and the like.

In the past, it has been common to produce oil through oil wells by down hole pumps that are activated by electric motors adjacent to the bottom of the well. Such motors are supplied with electric power by cables that extend downwardly in the wells from the ground surface. Difficulties have arisen in providing splice arrangements for connecting segments of the power cable used to supply the electricity to the down hole submersible pumps.

Currently, it is common to splice electrical power cables using an electrical crimp splice and insulating tapes to establish and maintain electrical connections between the conductive wires of power cable segments. The protective tapes, such as high modulus and high temperature tape, are wrapped around individual crimps in the power cable. The cable splice arrangements presently used are difficult and time consuming to install in the field and generally incapable of withstanding subterranean environment on a well bore over a desired period of time. Consequently, they may require frequent repair or replacement because the connections are subject to failure under the extreme pressure, temperature conditions, and high voltage stress encountered in well bore operations.

Prior art splicing techniques can be seen in U.S. Pat. No. 6,881,079 to McHugh et al. for a technique for providing power to a completion used in a subterranean environment by attaching an expandable connector that permits linear movement of the internal segments of the power cable. In U.S. Pat. No. 7,405,358 to Emerson, a splice for a down hole electrical submersible power cable has a protective housing and insulating sleeve crimp splice working in cooperation to create a sealed power cable connection. In U.S. Pat. No. 6,910,870 to Ebner, a high temper pot head is used to supply power to a submersible motor which does not require elastomeric sealing elements. In the Halpert et al. U.S. Pat. No. 6,545,221, a splice system for use in splicing coil tubing having an internal power cable is used for down hole equipment. The Ring U.S. Pat. No. 5,797,761 is for an electrical cable termination for use in oil field operation and has a female power connector for connecting to a power cable. In the Lawler et al. U.S. Pat. No. 5,478,970, an apparatus is provided for terminating an interconnecting rigid electrical cable. In the Stagi et al. U.S. Pat. No. 7,544,105, a cable and cable connection assembly is provided for connecting a first length of cable to an apparatus.

Other U.S. patents for use in splicing cables or connecting cables in a subterranean environment include the Moore U.S. Pat. Nos. 5,289,882 and 4,627,490 and 6,202,743. Also, U.S. Pat. No. 4,927,386 to Neuroth and U.S. Pat. No. 4,859,200 to McIntosh et al. and U.S. Pat. No. 5,670,747 to Lawer et al. and U.S. Pat. No. 6,881,079 to McHugh et al. Also in U.S. Patent Application Publications to Emerson US2008/0026623 and Maeland US2009/0197447 and Brotzell et al. US 2004/0012198.

SUMMARY OF THE INVENTION

A method of splicing a pair of electrical cables together includes the steps of selecting a pair of metal armored seal members, each sized to slide over an insulated and armored conductor and each having a plurality of O-ring seals on one end thereof and a plurality of openings in the side thereof. A crimp sleeve is then selected which is sized for crimping a pair of conductors together. An insulating tube is selected which is sized to slide over each end of a pair of insulated cable ends to be spliced together. One armored sealing sleeve is slid over each end of the pair of cables to spliced together. The crimp sleeve is then slid over one end of the pair of cables to be spliced together and crimped thereto and the selected insulating tube, slid over an end of the selected pair of conductors to be spliced together and is attached to one of the sealed members over the seal member plurality of O-ring seals. The other end of the cable's conductor has the crimp sleeve crimped thereto thereby electrically connecting the conductors together. The insulating tube attached to the metal sleeve is then aligned over the crimped sleeve and the other metal armored seal member is attached thereto by sliding the insulating sleeve over the O-rings thereon. Each armored seal member then has the plurality of holes therein filled with a sealant which sealant fills an enlarged area thereunder around the inside of the armored sleeve to bind and seal each armored seal to the cable and locking the insulating tube over the crimped conductors. The method can include lubricating the plurality of O-rings on the end of each metal armored seal prior to sliding the selected insulating tube thereover. The process also includes the step of aligning one end of one armored sleeve with the end of the insulation on one conductor and marking the insulated conductor at the other end of the armored sleeve to thereby allow the insulating tube to be aligned over the crimp. The process includes rotating each armored sleeve to align the plurality of openings in the side thereof for injecting the sealant therethrough. The process includes the step of splicing three pairs of electrical cables together and then covering the three spliced conductors with an insulating material thereover and the step of attaching a protective metal shield over the three spliced conductors.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
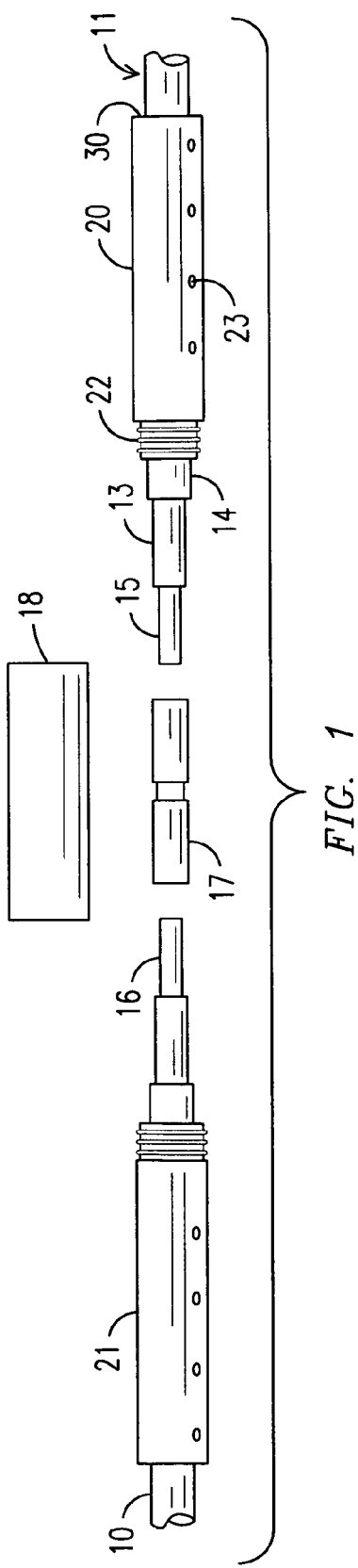
FIG. 1 is an exploded elevation of a pair of electrical cables and splicing components.
Figure 2:
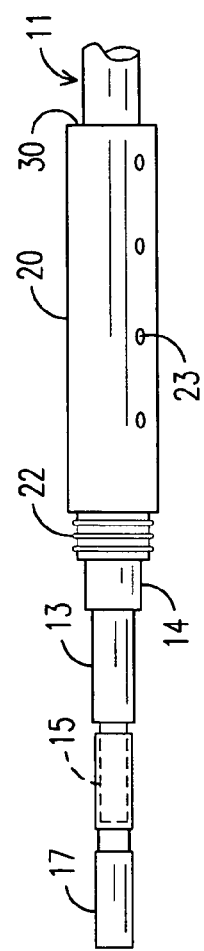
FIG. 2 is a side elevation of an electrical cable having an armored seal slid thereover.
Figure 3:
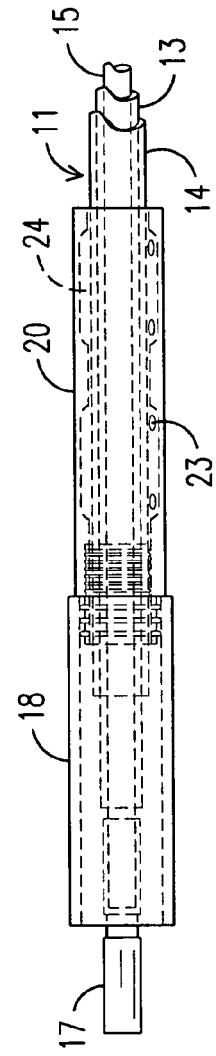
FIG. 3 is a side elevation of the cable of FIG. 2 having one end of an insulating tube attached to the armored seal.
Figure 4:
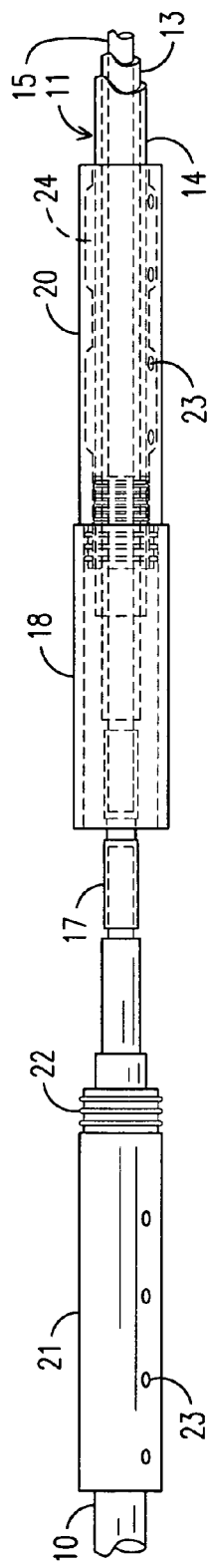
FIG. 4 is a side elevation of a pair of conductors being attached together and having the armored seal having an insulating conductor slid partway over the crimped conductors.
Figure 5:
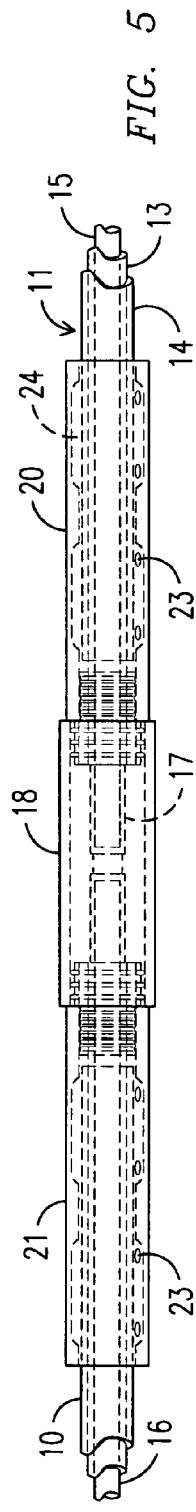
FIG. 5 is a side elevation having the insulating tube aligned over the crimped conductors and having both armored sleeves attached thereto.
Figure 6:
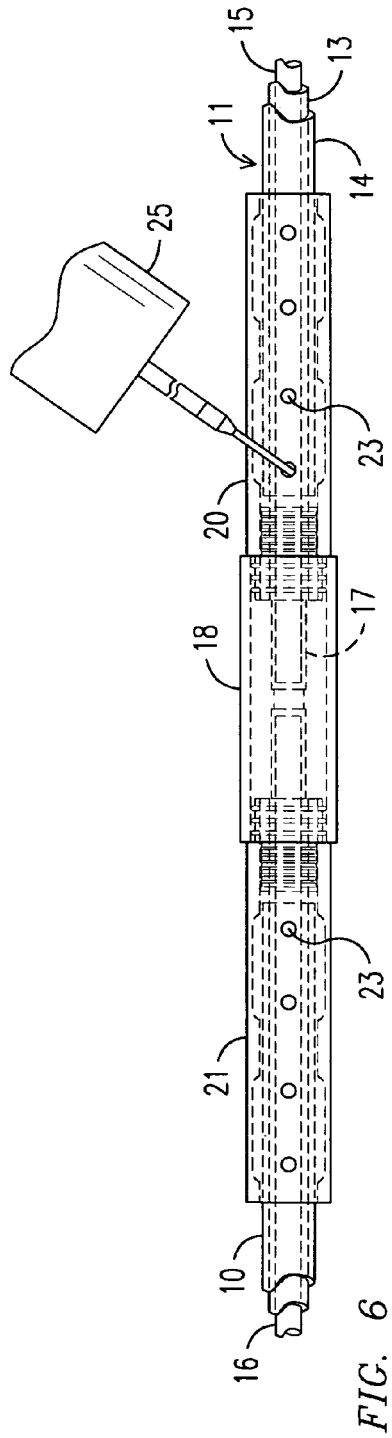
FIG. 6 illustrates the injection, of a sealant into each opening of the armored seal.
Figure 7:
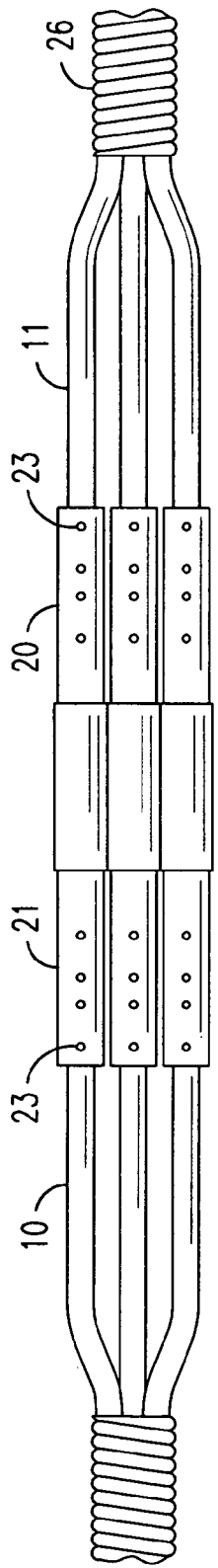
FIG. 7 is a top view of a three conductor cable having the three conductors spliced together.
Figure 8:
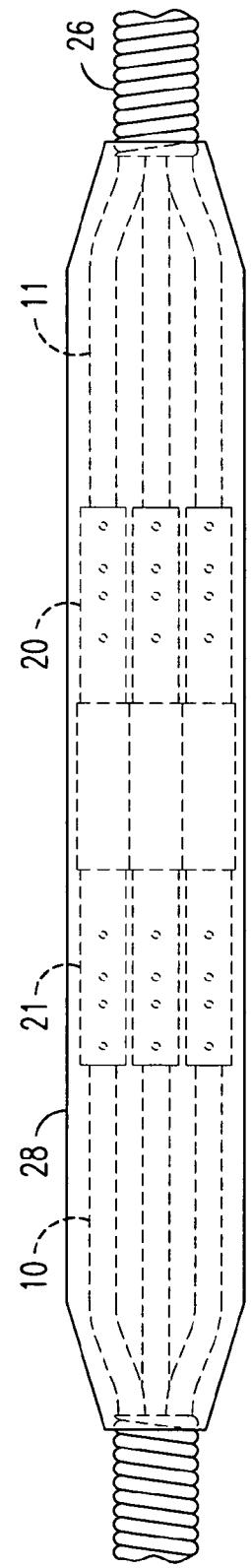
FIG. 8 is a top elevation of the spliced cables of FIG. 7 covered with a protective metal cover.

Referring to the drawings FIGS. 1-8, a pair of cables 10 and 11 are being spliced together. The cable 10 has an electrical conductor 16 while the cable 11 has an electrical conductor 15. Each electrical conductor 15 and 16 is covered by an electrical insulation 13, which may be made of rubber or a polymer. An outer shield 14 covers the insulation 13 on each conductor and may be made of lead. The ends of conductors 15 and 16 are being electrically connected together with a crimping connector 17. An electrically insulating center tube 18 is used to cover the crimped conductors. A pair of armored sealing tubes 20 and 21 may be made of polymer and steel and are shown slid over the cables 11 and 10, respectively. Each armored sealing tube 20 and 21 has a plurality of O-rings 22 and has a plurality open injecting ports or openings 23, as seen in FIG. 1. Each armored sealing tube 20 and 21 has a pair of annular recesses 24, as seen in FIG. 3, inside thereof so that when a sealant is injected through the injecting ports 23 it fills the recesses around the cables 11 and 10 to form a complete annular seal. The injected sealant may be a polymer sealant, injected with a syringe 25, as seen in FIG. 6. As seen in FIGS. 7 and 8, a cable 26 has three individual cables 11 on one end to be spliced and three individual cables 10 on the other side to be spliced together.

The present process involves the splicing of electric cables 10 and 11 for a power cable used to supply electricity to down hole submersible pumps and the like. The process begins by stripping the wrapped outer cable armor 26 from the end of each cable 10 and 11 to expose the ends of the conductors 15 and 16. The cables may be stripped back about 8-10 inches from each cable end. The lead shield 14 may be removed for a distance of 3⅝ inches as shown in FIG. 1. The insulation 13 may be stripped 15/16th of an inch for fitting into the crimp connector 17. The ends of cables 10 and 11 are cleaned with alcohol. The armored sealing tube 20 is slid over the cable 11 and the armored sealing tube 21 is slid over the cable 12. The armored sealing tube is slid to where the end with the O-rings 22 are even with the end of the trimmed insulation 13 so that this position can be marked at the other end 30 on the armored sealing tube 20. This position is marked on the cable 11 for the armored sealing tube 20. The same marking can be made on cable 10 using armored sealing tube 21.

The next step in the process slides the sealing tube 20 back on the insulation of the cable 11. The crimp connector 17 is then placed on the conductor 15 so that it touches the insulation 13 and is crimped thereto, as shown in FIG. 2. The O-rings 22 are then lightly lubricated with a clean dielectric silicone grease and the center insulating tube 18 is placed over the crimp connector 17 and onto the steel armored sealing tube 20 over the O-rings 22. The cable 10 can now have the conductor end 16 slid into the crimp connector 17 and crimped thereto, as shown in FIG. 4. Armored sealing tube 21 then has the clean silicone dielectric grease applied to the O-rings thereon. The armored sealing tube 21 is slid to attach the center insulating tube thereto over the O-rings 22. The armored sealing tube 20 then has the center insulating tube 18 attached thereto. Once the armored sealing tubes 20 and 21 are connected with the insulation center tube 18, they can be adjusted on the cables to align sealing tubes 20 and 21 with the marks previously placed on the cables 10 and 11. This aligns the armored sealing tube and the insulated center tube over the crimped conductors 15 and 16, as shown in FIG. 5.

The armored sealing tubes 20 and 21 are rotated to align all of the injection ports 23 and polymer sealant is injected with a syringe 25 through each injection port 23 in both the sealing tube 20 and 21. The injection sealant fills the annular recessed areas 24 in both the sealing tubes 20 and 21 and forms a complete seal to the insulation 13 and shield 14 of the cables 10 and 11, as seen in FIG. 6. This both seals the armored sealing tubes 20 and 21 to the cables 10 and 11 and also locks the center insulating tube 18 in place therebetween over the crimp connector 17. A polymer sealant is used in the syringe 25 which dispenses a two part polymer which is mixed in the syringe tube. Excess sealant is then wiped from the outside of each steel armored seal tube and the assembly allowed to cure while preparing to install the outer cover.

As can be seen in FIGS. 7 and 8, a typical electrical cable 26 has three electrical conductors being spliced together for a three-phase electrical circuit. Once the three cables are spliced together, in accordance with this process, an outer steel armor 28 cover is attached over the entire cable splice.

It should be clear at this time that a method of splicing a pair of electrical cables together has been provided which is especially adapted for splicing a power cable used to supply electricity to down hole submersible pumps or the like. However, the present method for splicing electrical cables can be utilized for splicing any electrical cables. The present invention is not to be construed as limited to the forms shown which are to be considered illustrative rather than restrictive.

We claim:

1. A method of splicing a pair of electrical cables together comprising the steps of:
   selecting a pair of armored seal members, each sized to slide over an insulated electrical conductor and each having a plurality of o-ring seals on one end thereof and a plurality of openings in the side thereof;
   selecting a crimp sleeve sized for crimping a pair of electrical conductors together;
   selecting an insulating tube sized to slide over crimped electrical conductors;
   stripping the insulation of each end of a pair of cables for splicing the pair of cables together;
   sliding each of said pair of armored seal members over one end of each pair of cables to be spliced together;
   crimping the selected crimp sleeve to one stripped end of said pair of cables to be spliced together;
   sliding said selected insulating tube over one end of said selected pair of conductors to be spliced and attaching one end of said insulated tube to one said armored seal member over said plurality of o-ring seals;
   crimping the other end of said crimp sleeve to the other stripped end of said pair of cable end conductors;
   aligning said insulating tube and attached armored seal member over said crimp sleeve;
   attaching said other armored seal member to said insulating tube over the o-ring seals on the end thereof; and
   filling each armored seal member with a sealant through said plurality of openings therein;
   whereby a pair of electrical cables for use in an adverse environment are spliced together.

2. The method of splicing a pair of electrical cables together in accordance with claim 1 in which each selected armored seal member has three o-rings on one thereof.

3. The method of splicing a pair of electrical cables together in accordance with claim 1 including the step of lubricating said plurality of o-rings on one end of each armored seal member prior to sliding said selected insulating tube thereover.

4. The method of splicing a pair of electrical cables together in accordance with claim 3 including the step of aligning one end of one armored seal member with the end of the insulation on one conductor and marking the insulated conductor at the other end thereof for aligning said insulating tube over said crimped pair of electrical conductors.

5. The method of splicing a pair of electrical cables together in accordance with claim 4 including the step of aligning said one end of said one armored seal tube with the marking on the insulated conductor following the crimping of the crimp sleeve to each electrical conductor.

6. The method of splicing a pair of electrical cables together in accordance with claim 5 including the step of rotating each selected armored seal member to align the plurality of openings in the side thereof prior to injecting said sealant therein.

7. The method of splicing a pair of electrical cables together in accordance with claim 6 in which said sealant is a polymer sealant.

8. The method of splicing a pair of electrical cables together in accordance with claim 7 including the step of splicing three pairs of electrical cables together and covering said three crimped conductors having insulating tubes thereover with an insulating material.

9. The method of splicing a pair of electrical cables together in accordance with claim 8 including the step of attaching a metal shield over said spliced conductors.

* * * * *